United States Patent [19]

Thompson et al.

[11] Patent Number: 4,913,585
[45] Date of Patent: Apr. 3, 1990

[54] METHOD OF TREATING SOLIDS CONTAINING WASTE FLUID

[75] Inventors: Larry F. Thompson; Wayne A. Moore, both of Gaylord, Mich.

[73] Assignee: Tricor Envirobonds, Ltd., St. Louis, Mo.

[21] Appl. No.: 287,869

[22] Filed: Dec. 21, 1988

[51] Int. Cl.⁴ .................. B09B 1/00; E21B 21/06; B01D 21/01
[52] U.S. Cl. ..................... 405/128; 175/66; 210/728; 210/734; 210/735
[58] Field of Search .............. 405/128, 129; 175/66; 252/8.51; 210/665, 702, 708, 710, 723–729, 732–735

[56] References Cited

U.S. PATENT DOCUMENTS

| 4,127,482 | 11/1978 | Watson et al. | 175/66 X |
| 4,353,803 | 10/1982 | Dover | 210/728 |
| 4,457,781 | 7/1984 | Palmer et al. | 405/128 X |
| 4,507,208 | 3/1985 | Simon et al. | 210/721 |
| 4,599,390 | 7/1986 | Fan et al. | 210/734 X |
| 4,741,838 | 5/1988 | Sharpe | 210/710 |
| 4,795,564 | 1/1989 | Bauer et al. | 210/665 |

FOREIGN PATENT DOCUMENTS 7614423  7/1977  Netherlands ............ 405/129

Primary Examiner—Dennis L. Taylor
Assistant Examiner—John Ricci
Attorney, Agent, or Firm—Edward H. Renner

[57] ABSTRACT

Waste drilling mud is stabilized for earthern burial. The waste drilling mud may be treated by flocculating, aggregating, agglomerating and dewatering the waste drilling mud and separating out free water. The free water may be reused or disposed of in a disposal well. The thickened, dewatered drilling mud solids may be further treated with a water absorbing binder to produce a residue which has sufficient bearing strength to support an earthen overburden and may be disposed of by burial. Suitable flocculating, agglomerating and dewatering polyelectrolytes may be used, including polyacrylamides, quarternary amine polymers and mixtures thereof. The water absorbing binders may include inorganic and organic materials, such as natural and synthetic water absorbing gums, polymers and inorganic colloidal absorbers.

22 Claims, 1 Drawing Sheet

METHOD OF TREATING SOLIDS CONTAINING WASTE FLUID

BACKGROUND AND SUMMARY OF THE INVENTION:

Applicants have devised a method for treating waste drilling mud to reduce its volume and mass and to stabilize it in a sufficiently solid state that it is safe for disposal. Applicants' process involves fluctuating and separating the solid material from waste drilling mud, decanting off a portion of the water from the waste drilling mud as free water and then tabilizing the flocculated sludge, solids and remaining water in a sufficiently solid form that the material may be disposed of in an on-site pit or may be bagged for disposal in a land fill while meeting the applicable State and Federal requirements concerning disposal of waste material. Applicants' process is considerably more economical than present methods of disposing of waste drilling mud. Applicants' process reduces both the weight and volume of material which must be disposed of by separating a substantial quantity of the water base from the waste drilling mud.

The oil drilling industry produces large quantities of solids containing fluid waste materials as by-products of the drilling process. Included in these waste materials are a variety of aqueous base drilling fluid materials. These drilling fluids, or muds as they are known, have a variety of functions in the drilling process. For example, they cool, lubricate and clean the drill string and drill bit, they flush cuttings out of the bore hole, they line the bore hole to prevent structural collapse and seal the bore hole to prevent escape of pressurized gases which can be a hazard.

Muds, typically are suspensions of solid materials in water. The solid materials may be naturally occurring materials such as bentonite clays, attapulgite clays or other clay materials only with or without sulphonates, hydroxides or acids and other conditioning chemicals. Conditioning chemicals are used to influence or modify the properties of the mud. In use, particles or pieces of rock, and other drilling debris, may also be present in the mud. In some instances the mud may be a suspension of synthetic polymers or a combination of synthetic polymers with clays.

Applicants are aware of the following U.S. and Canadian patents, the disclosures of which are incorporated by reference herein:

|  |
| --- |
| 2,775,557 |
| 2,854,407 |
| 3,025,236 |
| 3,040,820 |
| 3,081,260 |
| 4,379,763 |
| 4,396,513 |
| 4,518,507 |
| 4,580,925 |
| 4,668,128 |
| 522,850 Canadian |
| 522,851 Canadian |

During the process of drilling, the composition of the drilling mud may require changing due to changes in the conditions in the bore hole or because the drilling mud has worn out and lost its effectiveness. When a change in the drilling mud occurs and the drilling mud is removed from the bore, it becomes a waste material and must be disposed of according to applicable State and Federal regulations. In the past, drilling mud was disposed of on-site in an earth pit. The water contained in the drilling mud percolated into the surrounding soil leaving a solid or semi-solid residue in the pit which could be covered with earth. The water base of the mud, including soluble chemicals, leached out into the surrounding water table, polluting the same. This method of disposal is no longer permitted. Waste water is not permitted to enter the surrounding water table.

At present, where State and Federal regulations permit waste pits at all, they must be lined with tough plastic sheet to prevent contaminated water from leaching into the surrounding water table. However, the plastic sheet may not always prevent the escape of water into the surrounding water table. Lined pits create another problem, however, as the waste mud is a colloidal suspension in water. If the pit is lined to prevent migration of water into the surrounding soil, the waste mud remains fluid and will not support burial under an earthen overburden. At many drilling sites, waste pits are not permitted and the waste drilling mud must be trucked away for subsequent disposal at a landfill. In either case, that is, where the drilling mud is to be disposed of on-site in a lined pit, or is to be trucked away, it is now necessary to treat the waste mud to solidify it. If the spent mud is not solidified, the covering earth will sink to the bottom of the pit and the spent mud will rise to the top.

The art has solidified waste drilling mud, both on-site and for trucking to off-site landfills, by filtration to increase the solids content, for example in a filter press, or by mixing in large quantities of cement and/or fly ash to produce a thick mass of material. A process of the latter type is disclosed in U.S. Pat. No. 4,668,128. The thickening and/or filtering processes have been only partially effective solutions to the problem of disposing of waste drilling mud. Filtration is expensive and the application of fly ash and/or cement to the waste drilling fluid increases its volume and its weight substantially. There is an approximate increase of 30-40% in the volume of the waste drilling mud and a 150-200% increase in the weight of the waste drilling mud when it is stabilized by an addition of fly ash and/or cement. This greatly increases the cost of off-site disposal of the drilling mud. The increased weight and volume increase the cost of trucking the waste material to an off-site landfill, and increases the landfill charges. Landfill charges are based on both volume and weight of the material disposed. Overall, closed systems (systems without on-site pits) have an increase in drilling costs of 20-30% over systems using on-site pits. This cost is generated in part by the increased cost of disposing of spent mud and in part by other consequences of using a closed mud system, such as reduced penetration rate and well bore instability.

Applicants' method of treating waste drilling mud has the advantage of reducing the volume and mass of the mud, rather than increasing it. Applicants' method also provides a stable, solidified mass, having a high solids content, suitable for disposal both on-site or in an off-site facility, such as a landfill. Applicants' invention in the first phase involves treating the disposed mud with a flocculating and dewatering material effective to settle the mud solids present in the waste mud. The mud solid particles agglomerate and precipitant leaving free water, which may be decanted from the settled mud solids and reused or disposed. Suitable water disposal is in a disposal well below the water table. In the event the foregoing does not overcome the problems of preparing a material suitably stabilized, for earth burial for example, the separated sludge of mud solids is to be further treated by a suitable water absorbing binder material as described hereinafter, leaving a sludge that is stabilized. The stabilized sludge can be buried on-site or removed to a suitable landfill at minimal cost.

The separated sludge, while being of much lower volume and weight than the initial waste fluid, may still contain only 20-50% solids by weight. Applicants have found that by using a suitable water absorbing binder material, the precipitated mud solids, or sludge, can be stabilized to a point that it may be buried on-site or removed to a suitable landfill at minimal cost. The stabilizing material does not increase the volume or weight of the stabilized solids to any significant degree, yet it is effective at maintaining the sludge in a stable, solid condition suitable for earth burial or other disposal without contaminating the surrounding environment.

Applicants' first phase is superficially analogous to methods of separating sewage solids and other solids containing waste water. However, dewatering drilling muds present a much more difficult task Drilling muds contain much higher solids than waste water. Typically, drilling muds contain from about 3 to 10% by volume and sometimes as high as 20% by volume or more, or about 7 to 22% by weight, typically, and in some cases up to 40% by weight or more. Moreover, the particular solids, i.e., colloidal clays and polymers, have a much greater affinity for water than normal waste water solids. In particular, clay mud solids are of colloidal size and the clay particles have a platelet shape. In aqueous suspension, each platelet has an electrical charge distribution over the platelet surface. Consequently, the platelets repel each other and resist attempts to agglomerate the clay into particles of sufficiently large size that they may be separated from the aqueous suspension by flocculation and dewatering. Also, these clay platelets attempt to align themselves in a position of minimum free energy setting up what is known as a gel structure. In addition, the clay matrix or lattice will hydrate, in suspension, to incorporate water into the matrix or lattice structure Conventional waste water treatment methods, if applied to drilling muds, may produce a flocculated suspension in which the water is even more tightly bound and which will not dewater on subsequent treatment.

Applicants' process uses two types of reagents to counteract the high affinity of the drilling mud solids for water and to separate the drilling mud from water and to prepare the separated mud to a stabilized disposable state. The initial flocculating or dewatering treatment utilizes a flocculant, preferably a polyelectrolyte flocculant similar to those normally used in sewage treatment, but of high molecular weight. The polyelectrolyte or flocculant is preferably of the synthetic type such as polyacrylamide flocculants or quaternary amine flocculants, or mixtures of both types. The flocculants chosen are those which carry ionizable groups which are effective to neutralize the charges on the suspended mud solids and to flocculate or coagulate the suspended solids from the mud suspension. On treatment, the suspended mud solids separate out from free water and precipitate as a wet sludge of mud solids. Applicants have found that polyacrylamide polyelectrolytes having molecular weights on the order of $10^6$ or $10^7$ and which carry a charge are particularly effective to precipitate the mud solids. Suitable compounds may be obtained from a variety of commercial sources including the Axchem Company, which sells suitable partially hydrolyzed polyacrylamide (PHPA) anionic electrolytes having a molecular weight of about $18 \times 10^6$. Those products are commercially available, for example, under the trademark TELEZE, the products are designated by product numbers 158040, 158033 and 158021. For clay drilling mud suspensions, applicants have found that the high molecular weight PHPA electrolytes are those which are most effective to dewater the drilling mud compositions to separate the suspended material out as a sludge and to produce decantable free water from the drilling mud suspension.

Suitable quarternary amine polymers are those having a molecular weight of between about $10^5$–$10^6$ and having a charge of between about 60% and 85% per monomeric unit. These polymers are especially effective to agglomerate suspended clay platelets into larger particles which may be separated from suspension by flocculation. It is believed that the quarternary amine polymers are effective to neutralize the charge on the clay platelets and agglomerate the colloidal sized platelets into larger particles which may be separated or settled by flocculation. A particularly effective quarternary amine may be obtained from the Axchem Company under the trademark TELFIX, product number 158201. This material has an average molecular weight of about 150,000 and a charge of 77%. This material is a poly DADMAC (diallyl dimethyl ammonium chloride). Equivalent materials are available from other commercial sources.

In the next phase of applicants' invention, for stabilizing the separated sludge to a point at which it can be safely buried on-site or place on a landfill, applicants have found that water absorbing binders having the ability to absorb large amounts of water per weight of absorbent are effective to provide a stable sludge. The water absorbing material or binding material should preferably absorb or bind 50 and most preferably up to 100 or more times its weight of water. Suitable compounds may be chosen from water binding or gelling materials including organic stabilizing materials such as natural gums, e.g., carboxmethycellulose, guar, hydroxyethylcellulose, carrageenan, alginates and synthetic materials and mixtures of these materials. The natural materials may be most effective at treating fresh water muds and may be less effective on muds containing high salt concentrations or having high pH. Suitable effective synthetic materials include low molecular weight water absorbing polymers including low to moderate molecular weight polyacrylamide polymers. These synthetic polymers may have a molecular weight such that the polymer has a real specific gravity of about 1.14 and the dry particulate material will have a bulk specific gravity of about 0.85. The polymer has a melting point of between about 300°–350° F. The pH of a 0.5 percent solution of the polymer may vary from about 6 to 9, depending on the degree of substitution, if any, on the amine groups. The polymer may be cross-linked. Typical polyelectrolyte polymers will absorb up to one hundred times, or more, their dry weight of water and will retain this amount of water for over thirty minutes when subjected to one hundred psi pressure.

These polymers are commercially available from a variety of sources in dry particulate form and also as aqueous base solvent containing emulsions. Typical commercial emulsions have a pH of between about 6 and 8, a specific gravity of about 1.03, a boiling point of about 200° F. and a flash point of about 210° F. These emulsions typically have a Bingham plastic viscosity of about 30 centipoise and a Bingham yield point of about 18 (100 lb./ft$^2$).

Inorganic colloidal materials may also be used, such as pyrogenic silica. These materials are all available from a variety of commercial sources, for example, the Cabot Corporation produces suitable pyrogenic colloidal silica under the trademarks CAB-O-SIL and CAB-O-SPERCE. Organic water absorbing gums and stabilizers are available from a wide variety of commercial sources. Particularly suitable polyacrylamide water absorbing and binding polymers are available from Worldwide Environmental Services, Inc., under the trademark WASTE-LOCK and designated by product numbers 1200, 2400, L1 and L24. It is preferred that these water binding materials be selected to have as high a water binding property as possible to reduce the expense of reagents and of transporting the stabilized material. Materials and mixtures having the characteristics of binding fifty times their weight of water, or more, are most effective and the most preferred compounds have the characteristic of binding up to one hundred times or more of their weight in water. The water absorbing binder will normally be added at levels of between about 0.5 to 2.0 pounds per barrel of treated drilling mud residue, or about 0.1 to 0.5% by weight. The amount may be increased or decreased, depending on the water absorbing capacity of the water absorbing binder used and on the degree of stabilization required in the treated mud residue. It will be appreciated that in some instances, for example, when the waste drilling mud has a sufficiently high solids content in its unseparated state, applicants' second phase treatment may be applied directly to the waste drilling mud. For example, by treating a pit of waste drilling mud to render it suitable for earthen burial. In such cases the water absorbing binder may be added at levels up to about 10% by weight or more of the stabilized residue.

It is thus an object of applicants' invention to provide a method of disposing of waste drilling mud.

It is a further object of applicants' invention to provide a method of separating solid materials from waste drilling mud to reduce the volume and weight of materials which must be disposed of.

It is an object of applicants' invention to provide a method of stabilizing waste drilling mud to avoid contamination of the environment.

It is thus an object of the present invention to find a method of disposing of waste drilling mud fluids that will not pollute the environment. It is a further object of the invention to provide appropriate materials for treating the drilling mud sludge and for obtaining a valuable sludge product.

It is an object of applicants' invention to provide a method of separating waste drilling mud solids from the water base of the drilling mud.

It is an object of applicants' invention to reduce the volume and weight of waste drilling mud, to permit economical disposal.

It is an object of applicants' invention to produce a stable waste drilling mud product that will support earthen burial.

The invention may be further understood by reference to the following Description of the Drawings and Description of the Preferred Embodiments.

Figure 1:
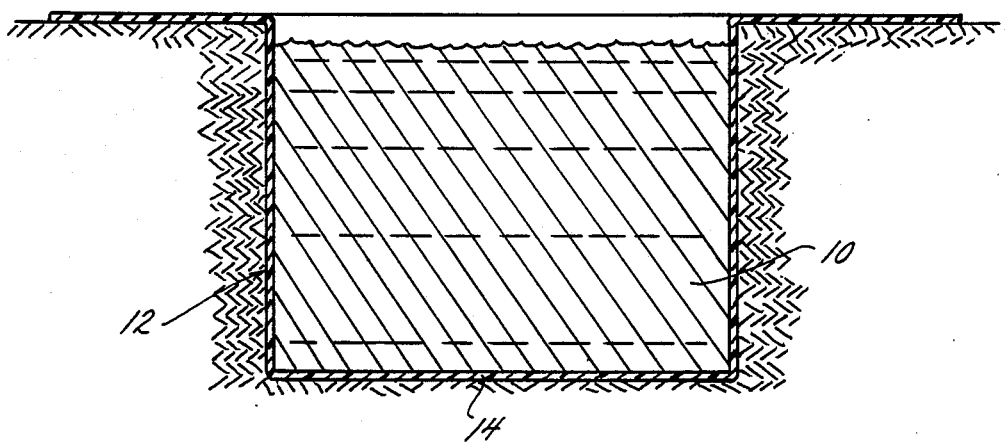
FIG. 1 is a schematic diagram of a step in the process of applicants' invention.

DESCRIPTION OF THE PREFERRED EMBODIMENTS:

Referring to FIG. 1, a schematic diagram of applicants' process is shown in which waste mud 10, for example as discharged from an oil drilling rig, is collected in a waste pit 12. The pit 12 may be an earthen pit, on-site, lined with a plastic liner 14. The mud 10 in this pit may be a typical formulation, for example, a bentonite or other clay base suspended in water.

Due to the complexities of drilling fluid formulations, it may be desirable to determine the best flocculation treatment from a sample of the drilling mud from the pit prior to treating the entire pit. The exact composition of the waste drilling mud is usually unknown due to the presence of debris from the bore hole, breakdown products of the original mud and the presence of conditioning chemicals. By testing to determine the optimum treatment, it is possible to produce an effective treatment which uses a minimum of reagents and which produces flocculation of the solids in a suitably short time. For example, a five gallon sample may be first tested to determine the optimum flocculation treatment for the particular material. In optimizing the flocculation treatment, it may be necessary to further condition the waste drilling mud by the addition of suitable ionization agents, such as the quarternary amine compounds, plus inorganic charge neutralizing materials. Suitable inorganic charge neutralizing materials include salts of alkaline and alkaline earth metals, such as sodium, potassium and calcium, e.g., calcium chloride, potassium oxide, potassium hydroxide, sodium oxide, sodium bicarbonate, alum, calcium hydroxide and other salts and bases of alkali and alkaline earth metals. This is done by trial and error, using a range of concentrations of sampling flocculants and ionizing agents. It will be appreciated that in most instances optimizing can be dispensed with, particularly if the cost and amount of added reagents are not significant.

EXAMPLE 1

PHASE 1

Once the optimum flocculating and dewatering regimen is determined, the treatment is applied to the mud 10 in the lined pit 12, for example, a 400 barrel discharge of waste bentonite base mud 10 containing about 0.1% of an organic suspension of a mud polymer. The mud polymer suspension is an acrylamide-methyl methacrylate copolymer having a molecular weight of about 4 to 5 million in a paraffinic organic suspension. The suspension is manufactured by Nalco Chemical Company and sold by M-I Drilling Fluids under the trademark POLY-PLUS. The mud formulation is typical of those from a Michigan drilling rig. This mud was treated to optimise the use of reagents, as follows: To the mud 10 in pit 12 was first added one pound per barrel of potassium oxide as an ionization agent; this ionization agent was thoroughly mixed into the mud. Seventeen pounds of a partially hydrolysed polyacrylamide flocculant (TELEZE 158033 PHPA) was then added. The PHPA is typically added as a suspension in water, for example, at about one half percent by weight. When the PHPA flocculant was mixed into the mud, an additional 1.25 pounds per barrel of calcium chloride was added to the mud and mixed in. Following that, an additional 100 pounds of PHPA flocculant was added to the mud in the pit and thoroughly mixed. After completion of that mixing step, an additional 1.25 pounds per barrel of calcium chloride was added to the pit and mixed in and a final addition of 43 pounds of flocculant was added to the mix.

Figure 2:
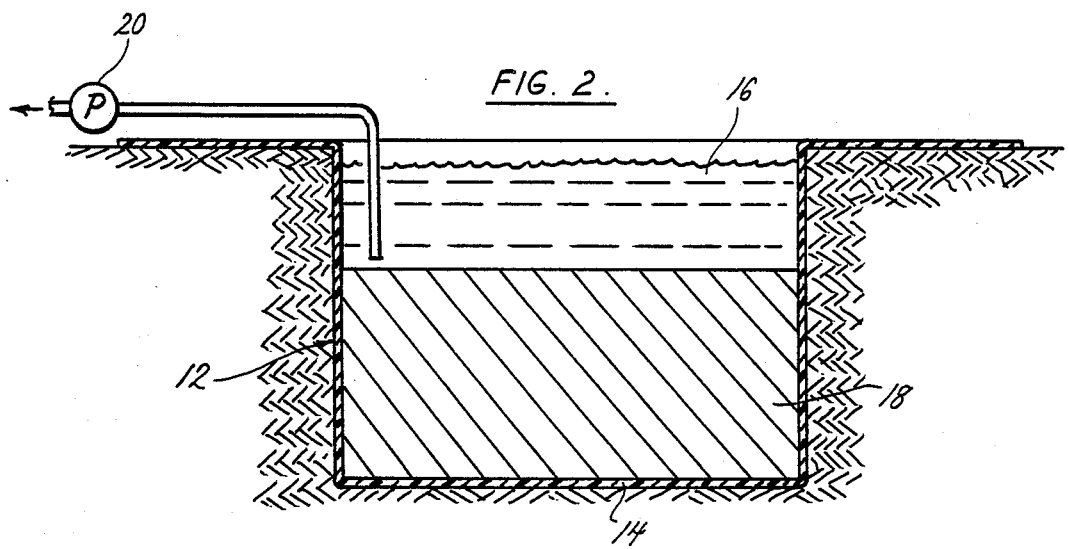
FIG. 2 is a schematic diagram of a subsequent step of applicants' invention.

The mud 10 in the pit was then permitted to settle and separate from the water of the mud formulation, as shown in FIG. 2. This settling occurred over about 2½ hours. When settling was completed, the separated water 16 on top of the sludge or flocculated solids 18 was pumped out of the pit 12 by pump 20, and into a disposal well, not shown, drilled in a secure strata below the water table. About 180 barrels of water was decanted at this stage. The remaining sludge 18 in the pit 12 had its solids content substantially increased to approximately 20-35% by volume from the original composition of about 12% by volume. This is a substantial increase in solids content.

PHASE 2

Figure 3:
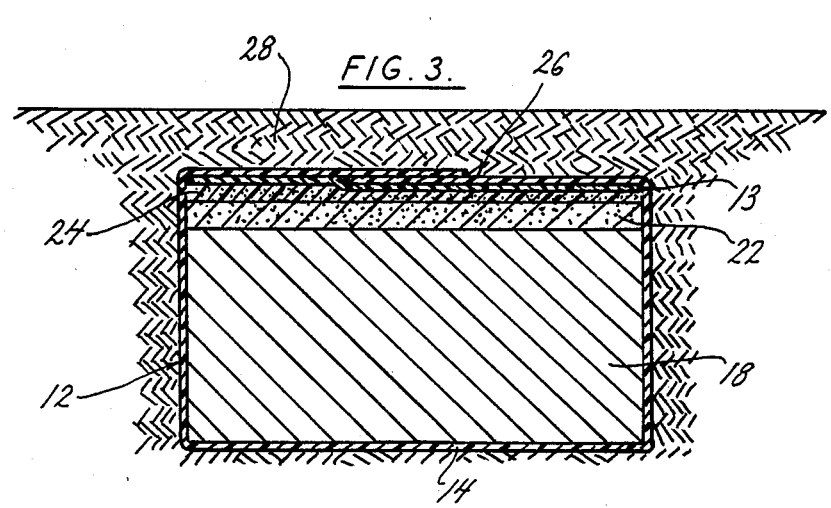
FIG. 3 is a schematic diagram of a further step of applicants' invention.

If the separated sludge is not sufficiently solid and stable to permit burial, since the required earthen overburden would not be supported by the sludge 18 in this condition, the sludge may be treated further. As shown in FIG. 3, the sludge 18 may be further treated by applying a water permeable layer, such as sand 22, for example, 4" in thickness, over the top of the sludge 18. An absorbent binder layer 24, for example, 1/6" in thickness (about 91 pounds of WASTE-LOCK 2400 or about 0.4 pounds per barrel of sludge), may be placed above layer 22. It will be appreciated that the absorbent material 24 may be mixed in with the sand 22 and placed on top of the sludge 18 in one layer, if desired. The pit 12 may then be sealed by placing a liner cap 13 over the pit 12 and folding the plastic liner 14 over the top of the pit 12, as shown at 26. A suitable overburden, such as earth 28, for example at a depth of four feet, may then be placed over the treated sludge 18. In this condition, the sludge 18 will be sufficiently solid and stabilized, that it will support the overburden 28. The pit 12 may then be sodded over, and the surface may be used for other purposes. In this condition, the overlying sand 22 and absorbent material 24, with the assistance of the overburden 28, will compress the sludge 18 so that a portion of the remaining moisture content will be squeezed out of the sludge 18 and percolate up through the sand layer 22 and into the water absorbent layer 24. The water absorbent layer 24 will bind the water in a thickened gel in layer 24. The water content of the sludge 18 will be further reduced by this procedure. The gel in layer 24 will remain in a highly stable condition rendering both the gel in layer 24 and the sludge 18 stable in the environment. The structure will support the weight of the overburden either as encapsulated in the plastic liner, by folding the liner over the top of the treated sludge, or without such incapsulation. The use of sand layer 22 and water absorbent binder layer 24, or a mixed layer of sand and water absorbent binder, permits the water absorbent binder to remain separated from the waste drilling mud solids. The action of the water absorbent binder remains free of interference by the action of the hygroscopic drilling mud solids, such as clay, and the effectiveness of the water absorbent binder may be further enhanced by this embodiment.

EXAMPLE 2

A waste drilling mud, as described in Example 1, is flocculated as described therein The mud may be from a closed drilling system having no reserve pit. The separated sludge having a solid content of approximately 20-35% by volume may be solidified by the addition of one gallon of water absorbent binder per barrel of sludge. (WASTE-LOCK TM L-1, an emulsion of polyacrylamide, sp. gravity 1.03, World-Wide Environmental Services, Inc.) The combined sludge and water absorbent binder may be mixed, bagged and sealed in plastic bags and allowed to solidify. The combined sludge and absorbent will solidify into a stable gel on standing for approximately 30 minutes. In its solidified form, the bagged sludge may then be trucked to a landfill for disposal The gelled sludge will be sufficiently solid and stable that it will support an overburden and will not migrate by leaching into the surrounding environment.

EXAMPLE 3

PHASE 1

A saltwater drilling mud containing 80,000 mg/l of chloride and 6800 mg/l of calcium was treated as follows: The flocculating and dewatering treatment was applied to the mud 10 in the pit 12, for example, a 1,575 barrel discharge of waste bentonite base mud 10. To the mud 10 in pit 12 was first added 54 gallons of quarternary amine (TELFIX 158201). The quarternary amine was thoroughly mixed into the mud. Three hundred pounds of a partially hydrolysed polyacrylamide flocculant (TELEZE 158033 PHPA) was then added and mixed. The PHPA was added as a suspension in water at about one half percent by weight.

After the mixing step, the mud 10 in the pit was permitted to settle and separate from the water of the mud formulation, as shown in FIG. 2. This settling occurred over about 1½ hours. When settling was completed, the separated water 16 on top of the sludge or flocculated solids 18 was pumped out of the pit 12 by pump 20, and into a disposal well, not shown, drilled in a secure stratum below the water table. About 750 barrels of water was decanted at this stage. The remaining sludge 18 in the pit 12 had its solids content substantially increased to approximately 36% by volume from the original composition of about 19% by volume. This is a substantial increase in solids content.

PHASE 2

If the separated sludge is not sufficiently solid and stable to permit burial, since the required earthen overburden would not be supported by the sludge 18 in this condition, the sludge may be treated further. As shown in FIG. 3, the sludge 18 may be further treated by applying a layer of sand 22, for example, 4" in thickness, over the top of the sludge 18. Above sand layer 22 an absorbent binder layer 24, (about 415 pound of WASTE-LOCK 2400), may be placed, for example, 1/16" in thickness. The pit 12 may then be sealed by folding the plastic liner 14 over the top of the treated sludge 18, as shown at 26 A suitable overburden, such as earth 28, for example at a depth of four feet, may then be placed over the treated sludge 18. In this condition, the sludge 18 will be sufficiently solid and stabilized, that it will support the overburden 28 and the pit 12 may be sodded over, and the surface may be used for other purposes. In this condition, the overlying sand 22 and absorbent material 24, with the assistance of the overburden 28, will compress the sludge 18 so that a portion of the remaining moisture content will be squeezed out of the sludge 18 and percolate up through the sand layer 22 and into the water absorbent layer 24, in accordance with Darcy's law. The water absorbent layer 24 will bind the water in a thickened gel in layer 24. The water content of the sludge 18 will be further reduced by this procedure. The gel in layer 24 will remain in a highly stable condition rendering both the gel in layer 24 and the sludge 18 stable in the environment. The structure will support the weight of the overburden either as encapsulated in the plastic liner, by folding the liner over the top of the treated sludge, or without such incapsulation.

EXAMPLE 4

A waste drilling mud, as described in Example 3, is flocculated as described therein. The mud may be from a closed drilling system having no reserve pit. The separated sludge having a solid content of approximately 36% by volume may be solidified by the addition of 6 pounds of water absorbent binder per barrel of sludge. (CAB-O-SIL TM, Cabot Corporation) The water absorbent binder may be added as a powder to the solidified sludge and mixed into the mass. The combined sludge and water absorbent binder may be bagged and sealed in plastic bags and allowed to solidify. The combined sludge and absorbent will solidify into a stable gel on standing for approximately 30 minutes. In its solidified form, the bagged sludge may then be trucked to a landfill for disposal. The gelled sludge will be sufficiently solid and stable that it will support an overburden and will not migrate by leaching into the surrounding environment.

EXAMPLE 5

PHASE 1

A bentonite base waste drilling mud was treated by flocculation and dewatering, as follows: The flocculating treatment was applied to the mud 10 in the pit 12, for example, a 700 barrel discharge of waste bentonite base mud 10. To the mud 10 in pit 12 was added 18 gallons of quarternary amine (TELFIX 158201). The quarternary amine was mixed with the mud and 210 pounds of powered acrylamide polymer (TELEZE 158033 PHPA) was then added and mixed. The PHPA is typically added as a suspension in water, for example, at about one half percent by weight.

The treated mud 10 in the pit was then permitted to settle and separate from the water of the mud formulation, as shown in FIG. 2. This settling occurred over about 2 hours. When settling was completed, the separated water 16 on top of the sludge or flocculated solids 18 was pumped out of the pit 12 by pump 20, and into a disposal well, not shown, drilled in a secure strata below the water table. About 350 barrels of water was decanted at this stage. The remaining sludge 18 in the pit 12 had its solids content substantially increased to approximately 24% by volume from the original composition of about 12% by volume. This is a substantial increase in solids content.

PHASE 2

If the separated sludge is not sufficiently solid and stable to permit burial, since the required earthen overburden would not be supported by the sludge 18 in this condition, the sludge may be treated further. As shown in FIG. 3, the sludge 18 may be further treated by applying a layer of sand 22, for example, 4" in thickness, over the top of the sludge 18. Above sand layer 22 an absorbent binder layer 24, (about 270 pounds of WASTE-LOCK 1200), may be placed, for example, 1/16" in thickness. The pit 12 may then be sealed by folding the plastic liner 14 over the top of the treated sludge 18, as shown at 26 A suitable overburden, such as earth 28, for example at a depth of four feet, may then be placed over the treated sludge 18. In this condition, the sludge 18 will be sufficiently solid and stabilized, that it will support the overburden 28 and the pit 12 may be sodded over, and the surface may be used for other purposes. In this condition, the overlying sand 22 and absorbent material 24, with the assistance of the overburden 28, will compress the sludge 18 so that a portion of the remaining moisture content will be squeezed out of the sludge 18 and percolate up through the sand layer 22 and into the water absorbent binder layer 24. The water absorbent binder layer 24 will bind the water in a thickened gel in layer 24. The water content of the sludge 18 will be further reduced by this procedure. The gel in layer 24 will remain in a highly stable condition rendering both the gel in layer 24 and the sludge 18 stable in the environment. The structure will support the weight of the overburden either as encapsulated in the plastic liner, by folding the liner over the top of the treated sludge, or without such incapsulation.

EXAMPLE 6

A waste drilling mud, as described in Example 5, is flocculated as described therein. The mud may be from a closed drilling system having no reserve pit. The separated sludge having a solid content of approximately 24% by volume may be solidified by the addition of 4 pounds of water absorbent binder per barrel of sludge (3.5 pounds of CAB-O-SIL plus 0.5 pounds of Waste Lock 2400). The water absorbent binder, combined sludge and absorbent may be mixed, bagged and sealed in plastic bags and allowed to solidify. The combined sludge and absorbent will solidify into a stable gel on standing for approximately 30 minutes. In its solidified form, the bagged sludge may then be trucked to a landfill for disposal. The gelled sludge will be sufficiently solid and stable that it will support an overburden and will not migrate by leaching into the surrounding environment.

EXAMPLE 7

PHASE 1

A bentonite base waste drilling mud was treated by flocculating and dewatering, as follows: The flocculating treatment was applied to the mud 10 in the pit 12, for example, a 680 barrel discharge of waste bentonite base mud 10. This mud was treated to optimise the use of reagents, as follows: To the mud 10 in pit 12 was first added 560 pounds of calcium chloride as an ionization agent. The ionization agent was thoroughly mixed into the mud. Twenty four gallons of quarternary amine (TELFIX 158201) was then mixed into the mud and 175 pounds of polyacrylamide (TELEZE 158021 PHPA)

was then added. The PHPA is typically added as a suspension in water, for example, at about one half percent by weight.

The treated mud 10 in the pit was permitted to settle and separate from the water of the mud formulation, as shown in FIG. 2. This settling occurred over about 2 hours. When settling was completed, the separated water 16 on top of the sludge or flocculated solids 18 was pumped out of the pit 12 by pump 20, and into a disposal well, not shown, drilled in a secure strata below the water table. About 300 barrels of water was decanted at this stage. The remaining sludge 18 in the pit 12 had its solids content substantially increased to approximately 24% by volume from the original composition of about 13% by volume. This is a substantial increase in solids content.

PHASE 2

If the separated sludge is not sufficiently solid and stable to permit burial, since the required earthen overburden would not be supported by the sludge 18 in this condition, the sludge may be treated further. As shown in FIG. 3, the sludge 18 may be further treated by applying a layer of sand 22, for example, 4" in thickness, over the top of the sludge 18. Above sand layer 22 an absorbent binder layer 24, (about 285 pounds of WASTE-LOCK 1200), may be placed, for example, 1/16" in thickness. It will be appreciated that the absorbent material 24 may be mixed in with the sand 22 and placed on top of the sludge 18 in one layer, if desired. The pit 12 may then be sealed by folding the plastic liner 14 over the top of the treated sludge 18, as shown at 26 A suitable overburden, such as earth 28, for example at a depth of four feet, may then be placed over the treated sludge 18. In this condition, the sludge 18 will be sufficiently solid and stabilized, that it will support the overburden 28 and the pit 12 may be sodded over, and the surface may be used for other purposes. In this condition, the overlying sand 22 and absorbent material 24, with the assistance of the overburden 28, will compress the sludge 18 so that a portion of the remaining moisture content will be squeezed out of the sludge 18 and percolate up through the sand layer 22 and into the water absorbent layer 24. The water absorbent layer 24 will bind the water in a thickened gel in layer 24. The water content of the sludge 18 will be further reduced by this procedure. The gel in layer 24 will remain in a highly stable condition rendering both the gel in layer 24 and the sludge 18 stable in the environment. The structure will support the weight of the overburden either as encapsulated in the plastic liner, by folding the liner over the top of the treated sludge, or without such incapsulation.

EXAMPLE 8

A waste drilling mud, as described in Example 7, is flocculated as described therein. The mud may be from a closed drilling system having no reserve pit. The separated sludge having a solid content of approximately 24% by volume may be solidified by the addition of 6 pounds of water absorbent binder (Waste-Lock L-24) per barrel of sludge. The water absorbent binder is added as a powder and mixed with the sludge. The water absorbent binder, combined sludge and absorbent may be mixed, bagged and sealed in plastic bags and allowed to solidify. The combined sludge and absorbent will solidify into a stable gel on standing for approximately 40 minutes. In its solidified form, the bagged sludge may then be trucked to a landfill for disposal. The gelled sludge will be sufficiently solid and stable that it will support an overburden and will not migrate by leaching into the surrounding environment.

EXAMPLE 9

PHASE 1

A fresh water polymer base drilling mud, originally formulated to contain 2 pounds per barrel of polymer (POLY-PLUS TM), one fourth pound per barrel of xanthan gum and ten pounds per barrel of unyielded bentonite (sodium montmorillonite) was treated by applicants' process. The spent mud contained about one pound per barrel of "free" polymer The flocculating and dewatering treatment was applied to the mud 10 in the pit 12, for example, a 600 barrel discharge of waste mud 10. To the mud 10 in pit 12 was added 90 gallons of quarternary amine (TELFIX 158201). The treated mud 10 in the pit was permitted to settle and separate from the water of the mud formulation, as shown in FIG. 2. This settling occurred over about 4 hours. When settling was completed, the separated water 16 on top of the sludge or flocculated solids 18 was pumped out of the pit 12 by pump 20, and may be returned to the drilling rig for reuse. About 450 barrels of water was decanted at this stage. The remaining sludge 18 in the pit 12 had its solids content substantially increased to approximately 40% by volume from the original composition of about 10% by volume. This is a substantial increase in solids content.

PHASE 2

If the separated sludge is not sufficiently solid and stable to permit burial, since the required earthen overburden would not be supported by the sludge 18 in this condition, the sludge may be treated further. As shown in FIG. 3, the sludge 18 may be further treated by applying a layer of sand 22, for example, 4" in thickness, over the top of the sludge 18. Above sand layer 22 an absorbent binder layer 24, Waste Lock 1200, may be placed, for example, 1/16" in thickness, about 0.5 pounds per barrel of the original waste mud. The pit 12 may then be sealed by folding the plastic liner 14 over the top of the treated sludge 18, as shown at 26 A suitable overburden, such as earth 28, for example at a depth of four feet, may then be placed over the treated sludge 18. In this condition, the sludge 18 will be sufficiently solid and stabilized, that it will support the overburden 28 and the pit 12 may be sodded over, and the surface may be used for other purposes. In this condition, the overlying sand 22 and absorbent material 24, with the assistance of the overburden 28, will compress the sludge 18 so that a portion of the remaining moisture content will be squeezed out of the sludge 18 and percolate up to the sand layer 22 and into the water absorbent layer 24. The water absorbent layer 24 will bind the water in a thickened gel in layer 24. The water content of the sludge 18 will be further reduced by this procedure. The gel in layer 24 will remain in a highly stable condition rendering both the gel in layer 24 and the sludge 18 stable in the environment. The structure will support the weight of the overburden either as encapsulated in the plastic liner, by folding the liner over the top of the treated sludge, or without such incapsulation.

EXAMPLE 10

A waste drilling mud, as described in Example 9, is flocculated as described therein. The mud may be from a closed drilling system having no reserve pit. The separated sludge having a solid content of approximately 40% by volume may be solidified by the addition of 4 pounds of water absorbent binder per barrel of sludge. (Waste-Lock L-1) The water absorbent binder is added as a powder and mixed into the sludge. The water absorbent binder, combined sludge and absorbant is then bagged and sealed in plastic bags and allowed to solidify. The combined sludge and absorbent solidifies into a stable gel on standing for approximately 30 minutes. In its solidified form, the bagged sludge may then be trucked to a landfill for disposal. The gelled sludge will be sufficiently solid and stable that it will support an overburden and will not migrate by leaching into the surrounding environment.

Applicants have found that their flocculating and dewatering process has useful application in filtering waste drilling mud to produce a dry solid residue. Normally, filtration of drilling mud, usually by filter press or belt filter, is extremely difficult and therefore very expensive. Drilling muds, by design, hold on to water and are thus very difficult to filter. In practice, drilling muds rapidly plug the filter medium and the actual increase in solids content which can be economically achieved is small. However, applicants have found that a very dry solid residue can be produced by first utilizing a flocculating and dewatering step, as described for phase 1 of applicants' process. The dry solid residue is highly stable and suitable for earthen burial. The residue is sufficiently concentrated (high solids) that it can provide a significant savings in the transportation and landfill charges for disposal. Applicants' filtration step is described further in Example 11.

EXAMPLE 11

A portion of the flocculated and dewatered sludge resulting from PHASE 1 of EXAMPLE 5 was filtered by passing it through a laboratory filter press (Oil Field Instruments and Testing Equipment, Inc., Houston, Texas). The sludge was forced throughout the filter press by 100 psi gas pressure. The sludge input to the filter press had a solids content of 24% by volume. The output residue had a solids content of 58% by volume and was substantially dry. The residue had sufficient bearing strength to support an earthen overburden and could be easily bagged; it had the consistency of damp clay. The residue can be handled by conventional solids conveying machinery, such as belt conveying and screw conveying devices.

It will be appreciated by those skilled in the art that various changes and modifications may be made to the method and materials described herein without departing from the spirit of applicants' invention. The invention is not to be limited by the specific examples, which are given here for the purposes of illustration, but only by the scope of the claims appended hereto and their equivalents.

We claim:

1. A method of treating a waste drilling mud residue having drilling mud solids suspended in an aqueous base comprising adding flocculating polymer to the waste drilling mud, the flocculating polymer consisting essentially of a mud solids flocculating polymer selected from the group consisting of acrylamide polyelectrolyes, quarternary amine polymers and mixtures thereof, the mud solids flocculating polymer being effective to agglomerate the drilling mud solids, flocculate the agglomerate drilling mud solids and separate free water from the flocculated drilling mud solids to produce a concentrated residue of wet drilling mud solids having a reduced volume and mass.

2. The method of claim 1 including decanting the free water from the flocculated drilling mud solids.

3. The method of claim 1 wherein the waste drilling mud is a clay base drilling mud.

4. The method of claim 1 wherein the waste drilling mud contains a mud polymer.

5. The method of claim 1 including treating the concentrated residue of wet drilling mud solids to stabilize the concentrated residue of wet drilling mud solids for earthen burial.

6. The method of claim 1 wherein the mud solids flocculating polymer is a polyacrylamide polymer having a molecular weight of about $18 \times 10^6$.

7. A method of treating waste drilling mud having mud solids suspended in an aqueous base comprising treating the waste drilling mud with a water absorbing binder, the water absorbing binder being effective to stabilize the waste drilling mud and produce a firm material suitable for earth burial without substantially increasing the volume and weight of the treated waste drilling mud, the treated waste drilling mud having sufficient bearing strength to support a covering overburden of earth.

8. The method of claim 7 wherein the water absorbing binder is added to the suspended drilling mud solids.

9. The method of claim 8 wherein the stabilized drilling mud solids are disposed of in a landfill.

10. The method of claim 9 including placing the stabilized drilling mud solids in a container and burying the container.

11. The method of claim 7 including covering the suspended drilling mud solids with a water permeable layer, covering the suspended drilling mud solids with a layer of the water absorbing binder and burying the treated suspended waste drilling mud solids under an earthen overburden.

12. The method of claim 11 wherein the water absorbing binder is included in the water permeable layer.

13. A method of treating waste drilling mud having mud solids suspended in an aqueous base comprising treating the waste drilling mud with a water absorbing binder, the water absorbing binder being selected from the group of organic and inorganic water absorbing binders having the property of absorbing about 50 times their weight in water or more, the water absorbing binder being effective to stabilize the waste drilling mud and produce a firm material suitable for earthen burial without substantially increasing the weight and volume of the treated waste drilling mud, the treated waste drilling mud having sufficient bearing strength to support a covering overburden of earth.

14. A method of treating a waste drilling mud having drilling mud solids suspended in an aqueous base comprising adding a mud solids flocculating polymer to the drilling mud, the mud solids flocculating polymer being effective to agglomerate the drilling mud solids, flocculate the agglomerated drilling mud solids and separate free water from the flocculated drilling mud solids to produce a concentrated residue of wet drilling mud solids, treating the concentrated residue of wet drilling mud solids with a water selected absorbing binder, the water absorbing binder being selected from the group of organic and inorganic water absorbing binders having the property of absorbing about 50 times their weight in water or more, the water absorbing binder being effective to stabilize the residue of wet drilling mud solids and produce a firm residue suitable for earth burial without substantially increasing the volume and weight of the treated residue of wet drilling mud solids, the treated residue having sufficient bearing strength to support a covering overburden of earth.

15. The method of claim 14 including placing the stabilized treated residue in a container and burying the container.

16. The method of claim 14 including placing the waste drilling mud solids in a lined earthen pit, decanting the free water from the earthen pit, and covering the concentrated residue of wet drilling mud solids with a water permeable layer, covering the concentrated residue of wet drilling mud solids with a water absorbing binder and covering the concentrated residue of wet drilling mud solids with an earthen overburden, the weight of the earthen overburden pressing additional free water out of the concentrated wet drilling mud solids and into the water permeable layer, absorbing and binding the additional free water in the water absorbing binder to produce a stable treated residue.

17. The method of claim 16 wherein the treated concentrate of wet drilling mud solids is encapsulated in the liner of the earthen pit.

18. The method of claim 16 wherein the water absorbing binder is included in the water permeable layer.

19. The method of claim 14 wherein the mud solids flocculating polymer is a polyacryamide polymer having a molecular weight of about $10^6$ to $10^7$.

20. The method of claim 14 wherein the mud solids flocculating polymer is a quaternary amine polymer having a molecular weight of about $10^5$ to $10^6$.

21. A method of treating a waste drilling mud having drilling mud solids suspended in an aqueous base comprising adding a mud solids flocculating polymer to the drilling mud, the mud solids flocculating polymer being effective to agglomerate drilling mud solids and separate free water from the flocculated drilling mud solids to produce a concentrated residue of wet drilling mud solids, the concentrated residue of wet drilling mud solids being placed in a lined earthen pit and the separated free water being decanted from the pit, covering the concentrated residue, with a water permeable layer and a water absorbing binder, the water absorbing binder being placed as a separate layer over the water permeable layer, the water absorbing binder being effective to stabilize the residue of wet drilling mud solids and produce a firm residue suitable for earth burial without substantially increasing the volume and weight of the treated sufficient bearing strength to support a covering overburden of earth, covering the concentrated residue of wet drilling mud solids with an earthen overburden, the weight of the earthen overburden pressing additional water out of the concentrated wet drilling mud solids and through the water permeable layer, absorbing and binding the additional free water in the water absorbing binder to produce a stable treated residue.

22. A method of treating a waste drilling mud having drilling mud solids suspended in an aqueous base comprising adding a mud solids flocculating polymer to the drilling mud, the mud solids flocculating polymer being effective to agglomerate drilling mud solids and separate free water from the flocculated drilling mud solids to produce a concentrated residue of wet drilling mud solids the concentrated residue of wet drilling mud solids being placed in a lined earthen pit and the separated free water being decanted from the pit, covering the concentrated residue, with a water permeable layer and a water absorbing binder, the water permeable layer being sand, the water absorbing binder being effective to stabilize the residue of wet drilling mud solids and produce a firm residue suitable for earth burial without substantially increasing the volume and weight of the treated reside of wet drilling mud solids, the treated residue having sufficient bearing strength to support a covering overburden of earth, covering the concentrated residue of wet drilling mud solids with an earthen overburden, the weight of the earthen overburden pressing additional water out of the concentrated wet drilling mud solids and through the water permeable layer, absorbing and binding the additional free water in the water absorbing binder to produce a stable treated residue.

* * * * *